United States Patent
Hashimoto

(10) Patent No.: US 9,467,588 B2
(45) Date of Patent: Oct. 11, 2016

(54) SERVER AND METHOD FOR THE SAME

(71) Applicant: BROTHER KOGYO KABUSHIKI KAISHA, Nagoya-shi, Aichi-ken (JP)

(72) Inventor: Naoki Hashimoto, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 13/686,420

(22) Filed: Nov. 27, 2012

(65) Prior Publication Data

US 2013/0135675 A1 May 30, 2013

(30) Foreign Application Priority Data

Nov. 30, 2011 (JP) ................................. 2011-262487

(51) Int. Cl.
- *H04N 1/00* (2006.01)
- *G06F 3/12* (2006.01)
- *H04L 29/08* (2006.01)

(52) U.S. Cl.
CPC .......... *H04N 1/0097* (2013.01); *G06F 3/1204* (2013.01); *G06F 3/1254* (2013.01); *G06F 3/1257* (2013.01); *G06F 3/1288* (2013.01); *H04L 67/125* (2013.01); *H04L 67/141* (2013.01); *H04L 67/143* (2013.01); *H04L 67/306* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 5,768,483 A | * | 6/1998 | Maniwa | .................. H04L 41/08 358/1.14 |
| 6,967,728 B1 | * | 11/2005 | Vidyanand | ............ G06F 3/1204 358/1.1 |
| 7,124,094 B1 | * | 10/2006 | Kobayashi | ........... G06Q 20/382 705/27.2 |

(Continued)

FOREIGN PATENT DOCUMENTS

| | | |
|---|---|---|
| JP | 2003-241927 A | 8/2003 |
| JP | 2003-330686 A | 11/2003 |

(Continued)

OTHER PUBLICATIONS

European Patent Office, extended European Search Report for European Patent Application No. 12193538.1 (counterpart European patent application), dated May 2, 2013.

(Continued)

*Primary Examiner* — Ted Barnes
(74) *Attorney, Agent, or Firm* — Merchant & Gould P.C.

(57) ABSTRACT

A server is provided that includes a connection establishing unit configured to establish a connection with an intended image processing device, an information acquiring unit configured to acquire user information for identifying a user who requests to establish the connection with the intended image processing device, a storage unit configured to store the user information acquired by the information acquiring unit, in association with the intended image processing device, and a changing unit configured to change a setting for each image processing device belonging to a group that includes image processing devices stored in the storage unit in association with user information identical to the acquired user information.

19 Claims, 12 Drawing Sheets

(56) References Cited

U.S. PATENT DOCUMENTS

| | | | | |
|---|---|---|---|---|
| 7,619,763 B2* | 11/2009 | Gibson | B41J 29/393 | 358/1.13 |
| 7,619,765 B2* | 11/2009 | Kimura | G06F 3/1204 | 358/1.11 |
| 8,087,088 B1* | 12/2011 | Pennington | G06F 11/3692 | 709/206 |
| 2003/0011802 A1* | 1/2003 | Nakagiri | G06F 3/1205 | 358/1.13 |
| 2003/0053105 A1* | 3/2003 | Morooka | G06F 3/1204 | 358/1.13 |
| 2003/0053129 A1* | 3/2003 | Morooka | G06F 3/1205 | 358/1.15 |
| 2003/0103235 A1* | 6/2003 | Gomi | G06F 3/1229 | 358/1.15 |
| 2003/0112456 A1* | 6/2003 | Tomita | G06F 3/1204 | 358/1.13 |
| 2004/0156071 A1* | 8/2004 | Lay | G06F 3/1205 | 358/1.15 |
| 2004/0196491 A1* | 10/2004 | Uchino | G06F 21/608 | 358/1.15 |
| 2005/0060649 A1* | 3/2005 | Kimura | G06F 3/1204 | 715/274 |
| 2005/0102442 A1* | 5/2005 | Ferlitsch | G06F 3/1204 | 710/15 |
| 2006/0017951 A1* | 1/2006 | Tanaka | G06F 3/1222 | 358/1.13 |
| 2006/0017953 A1* | 1/2006 | Ly | G06F 3/1207 | 358/1.13 |
| 2006/0023246 A1* | 2/2006 | Vidyanand | G06F 3/1204 | 358/1.13 |
| 2006/0158684 A1* | 7/2006 | Partanen | G06F 3/1222 | 358/1.15 |
| 2006/0170963 A1* | 8/2006 | Aoki | G06F 3/1204 | 358/1.15 |
| 2007/0046994 A1* | 3/2007 | Morales | G06F 3/1204 | 358/1.16 |
| 2007/0076253 A1* | 4/2007 | Shima | G06F 3/1222 | 358/1.15 |
| 2007/0088814 A1* | 4/2007 | Torii | H04L 41/0273 | 709/223 |
| 2008/0092144 A1* | 4/2008 | Nakazawa | H04L 41/06 | 718/105 |
| 2008/0144086 A1* | 6/2008 | Shibao | H04N 1/00244 | 358/1.15 |
| 2008/0231880 A1* | 9/2008 | Ming | H04N 1/00244 | 358/1.15 |
| 2008/0246992 A1* | 10/2008 | Yamamichi | G06F 3/1208 | 358/1.15 |
| 2008/0252922 A1* | 10/2008 | Ikegami | H04L 63/083 | 358/1.15 |
| 2008/0297829 A1* | 12/2008 | Paek | H04N 1/00244 | 358/1.15 |
| 2009/0116052 A1* | 5/2009 | Matsuzawa | G06F 3/121 | 358/1.14 |
| 2009/0147301 A1* | 6/2009 | Lee | G06F 3/1222 | 358/1.15 |
| 2009/0225366 A1* | 9/2009 | Emori | G06F 3/1204 | 358/1.15 |
| 2009/0235341 A1* | 9/2009 | Hashimoto | G06F 21/608 | 726/5 |
| 2010/0095295 A1* | 4/2010 | Harada | G06F 3/1204 | 717/176 |
| 2010/0157346 A1* | 6/2010 | Waki | H04N 1/00278 | 358/1.13 |
| 2010/0302579 A1* | 12/2010 | Nuggehalli | G06F 3/1203 | 358/1.15 |
| 2011/0019232 A1* | 1/2011 | Kobayashi | G06F 3/1204 | 358/1.15 |
| 2011/0063668 A1* | 3/2011 | Shirai | G06F 3/1204 | 358/1.15 |
| 2011/0087905 A1 | 4/2011 | Akiyama et al. | | |
| 2011/0134466 A1* | 6/2011 | Nakagawa | G06F 3/1205 | 358/1.15 |
| 2011/0141511 A1* | 6/2011 | Milanski | G06F 3/1204 | 358/1.15 |
| 2011/0176162 A1* | 7/2011 | Kamath | G06F 3/1204 | 358/1.15 |
| 2011/0182208 A1* | 7/2011 | Shima | G06F 1/266 | 370/254 |
| 2011/0188063 A1* | 8/2011 | Nuggehalli | G06F 3/1236 | 358/1.13 |
| 2011/0199640 A1* | 8/2011 | Shirai | G06F 3/1204 | 358/1.15 |
| 2011/0216359 A1* | 9/2011 | Kamisuwa | G06F 3/12 | 358/1.15 |
| 2011/0242568 A1* | 10/2011 | Soga | G06F 3/1204 | 358/1.13 |
| 2011/0242598 A1* | 10/2011 | Ohara | G06F 3/1205 | 358/1.15 |
| 2011/0255115 A1* | 10/2011 | Tokuda | G06F 3/1205 | 358/1.13 |
| 2011/0273738 A1* | 11/2011 | Tanaka | G06F 3/1205 | 358/1.14 |
| 2012/0019858 A1* | 1/2012 | Sato | H04N 1/00344 | 358/1.15 |
| 2012/0019865 A1* | 1/2012 | Takahashi | G06F 3/1204 | 358/1.15 |
| 2012/0120437 A1* | 5/2012 | Nanaumi | G06F 3/1205 | 358/1.15 |
| 2012/0268778 A1* | 10/2012 | Nakawaki | G06F 3/122 | 358/1.15 |
| 2013/0036170 A1* | 2/2013 | Hori | G06F 3/1204 | 709/204 |
| 2013/0107320 A1* | 5/2013 | Vidyanand | G06F 3/1204 | 358/1.15 |
| 2013/0308165 A1* | 11/2013 | Venkatesh | G06F 3/1205 | 358/1.15 |
| 2015/0264199 A1* | 9/2015 | Mizuno | H04N 1/0097 | 358/1.16 |

FOREIGN PATENT DOCUMENTS

| | | |
|---|---|---|
| JP | 2004-118231 A | 4/2004 |
| JP | 2008-154048 A | 7/2008 |
| JP | 2011-154446 A | 8/2011 |
| JP | 2011-154506 A | 8/2011 |

OTHER PUBLICATIONS

Notification of Reasons of Rejection, issued in related Japanese Application No. 2011-262487, mailed Mar. 3, 2015.

European Patent Office Communication issued in related EP application No. 12 193 538.1, Jun. 29, 2016.

* cited by examiner

| GROUP NAME | ACCOUNT NAME | PRINTER NAME | PRINTER ADDRESS | ESTABLISHMENT STATUS | ESTABLISHMENT TIME | SELF-DISCONNECTION |
|---|---|---|---|---|---|---|
| GROUP A | ACCOUNT A | PRINTER 100 | 192.168.0.0 | IN | 2011/10/01 08:30:00 | OFF |
| GROUP A | ACCOUNT A | PRINTER 101 | 192.168.0.1 | IN | 2011/11/12 12:00:00 | OFF |
| GROUP A | ACCOUNT A | PRINTER 102 | 192.168.0.2 | OUT | 2011/11/30 08:30:00 | OFF |
| GROUP B | ACCOUNT B | PRINTER 103 | 192.168.0.3 | IN | 2011/01/30 12:30:00 | OFF |
| GROUP B | ACCOUNT B | PRINTER 104 | 192.168.0.4 | OUT | 2011/11/10 10:30:00 | OFF |

| ACCOUNT NAME | PASSWORD |
|---|---|
| ACCOUNT A | a1b2c3d4e5 |
| ACCOUNT B | z9y8x7w6v5 |
| ACCOUNT C | Fghijk0 |

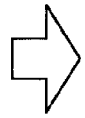

FIG. 9

(AT THE TIME OF RECEIPT OF LOGOUT REQUEST) 541

| GROUP NAME | ACCOUNT NAME | PRINTER NAME | PRINTER ADDRESS | ESTABLISHMENT STATUS | ESTABLISHMENT TIME | SELF-DISCONNECTION |
|---|---|---|---|---|---|---|
| GROUP A | ACCOUNT A | PRINTER 100 | 192.168.0.0 | IN | 2011/10/01 08:30:00 | OFF |
| GROUP A | ACCOUNT A | PRINTER 101 | 192.168.0.1 | IN | 2011/12/01 12:00:00 | OFF |
| GROUP A | ACCOUNT A | PRINTER 102 | 192.168.0.2 | IN | 2011/12/01 12:00:00 | OFF |
| GROUP B | ACCOUNT B | PRINTER 103 | 192.168.0.3 | IN | 2011/01/30 12:30:00 | OFF |
| GROUP B | ACCOUNT B | PRINTER 104 | 192.168.0.4 | OUT | 2011/11/10 10:30:00 | OFF |

(JUST BEFORE GROUP SIGN-OUT PROCESS) 541

| GROUP NAME | ACCOUNT NAME | PRINTER NAME | PRINTER ADDRESS | ESTABLISHMENT STATUS | ESTABLISHMENT TIME | SELF-DISCONNECTION |
|---|---|---|---|---|---|---|
| GROUP A | ACCOUNT A | PRINTER 100 | 192.168.0.0 | IN | 2011/10/01 08:30:00 | ON |
| GROUP A | ACCOUNT A | PRINTER 101 | 192.168.0.1 | IN | 2011/12/01 12:00:00 | ON |
| GROUP A | ACCOUNT A | PRINTER 102 | 192.168.0.2 | IN | 2011/12/01 12:00:00 | ON |
| GROUP B | ACCOUNT B | PRINTER 103 | 192.168.0.3 | IN | 2011/01/30 12:30:00 | OFF |
| GROUP B | ACCOUNT B | PRINTER 104 | 192.168.0.4 | OUT | 2011/11/10 10:30:00 | OFF |

# SERVER AND METHOD FOR THE SAME

CROSS-REFERENCE TO RELATED APPLICATION

This application claims priority under 35 U.S.C. §119 from Japanese Patent Application No. 2011-262487 filed on Nov. 30, 2011. The entire subject matter of the application is incorporated herein by reference.

BACKGROUND

1. Technical Field

The following description relates to one or more techniques for a server connectable with an image processing device, more particularly, for a server configured to perform data communication of a job with an image processing device in a state where an established connection is maintained between the server and the image processing device.

2. Related Art

An image processing system has been known that includes a server and an image processing device configured to accept a job from the server in a state where an established connection with the server is maintained.

As an example of the known image processing system, a technique has been proposed in which when a user performs a copying operation with a multi-function peripheral, the user reads out authentication data from his/her ID card using a card reading device, transmits the authentication data to a print limiting server to conduct authentication with respect to the authentication data, and issues an instruction to begin the copying operation at any time after the authentication. Further, in the proposed technique, the multi-function peripheral issues a notification on logout to the print limiting server after a lapse of a predetermined time period since completion of the copying operation.

SUMMARY

However, the proposed printing system has the following problem. That is, when the user utilizes a plurality of image processing devices, the user is required to configure troublesome settings for each of the image processing devices. For instance, when an image processing device terminates the connection with the server, the user has to reestablish the connection to utilize the image processing device again. To establish the connection between the server and the image processing device, the user needs to perform troublesome operations such as reading out the ID card and entering account information. In particular, as the number of the image processing devises available for the user increases, the user is required to make more effort to configure the settings for each image processing device.

Aspects of the present invention are advantageous to provide one or more improved, techniques for a server that make it possible to lessen a burden placed on a user who is required to configure settings for available image processing devices.

According to aspects of the present invention, a server is provided that includes a connection establishing unit configured to establish a connection with an intended image processing device, an information acquiring unit configured to acquire user information for identifying a user who requests to establish the connection with the intended image processing device, a storage unit configured to store the user information acquired by the information acquiring unit, in association with the intended image processing device, and a changing unit configured to change a setting for each image processing device belonging to a group that includes image processing devices stored in the storage unit in association with user information identical to the acquired user information.

According to aspects of the present invention, further provided is a server that includes an connection interface configured to connect with an external device, a storage unit, and a controller configured to perform control operations including establishing a connection with an intended image processing device, via the connection interface, acquiring user information for identifying a user who requests to establish the connection with the intended image processing device, storing, in the storage unit, the acquired user information in association with the intended image processing device, and changing a setting for each image processing device belonging to a group that includes image processing devices stored in the storage unit in association with user information identical to the acquired user information.

According to aspects of the present invention, further provided is a method configured to be implemented on a processor, the method including establishing a connection with an image processing device, acquiring user information for identifying a user who requests to establish the connection with the image processing device, storing, in a storage unit, the acquired user information in association with the image processing device, and changing a setting for each image processing device belonging to a group that includes image processing devices stored in the storage unit in association with user information identical to the acquired user information.

BRIEF DESCRIPTION OF THE ACCOMPANYING DRAWINGS

FIG. 3 exemplifies a group DB of the cloud server that is a database for grouping and managing printers, which utilize the cloud server, by account in the embodiments according to one or more aspects of the present invention.

FIG. 4 exemplifies an account DB of the cloud server that is a database for storing accounts in association with respective passwords in the embodiments according to one or more aspects of the present invention.

Figure 5:
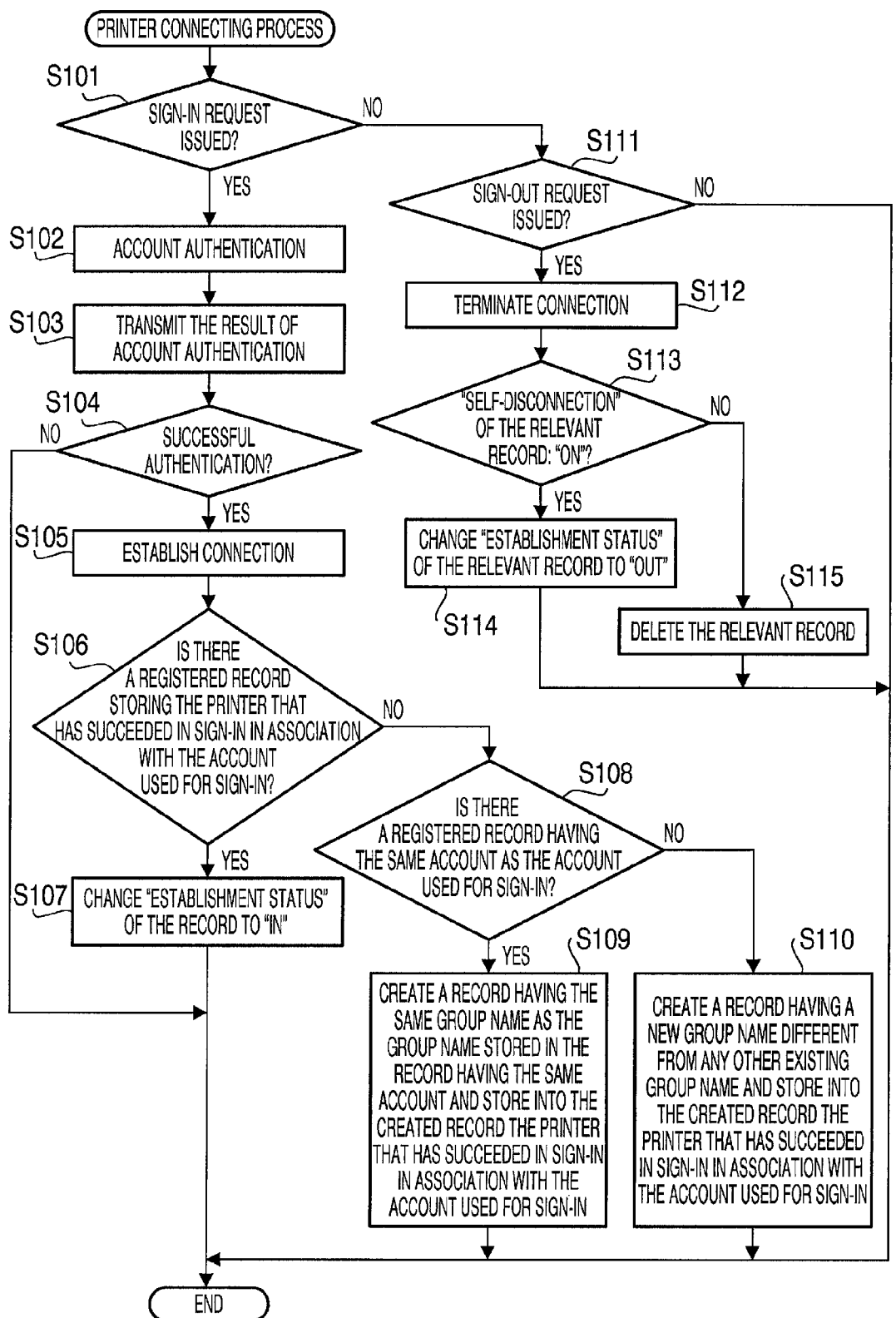

FIG. 5 is a flowchart showing an operational procedure of a printer connecting process to be executed by the cloud server to control a status (sign-in/sign-out) of a connection with a printer in a first embodiment according to one or more aspects of the present invention.

Figure 6:
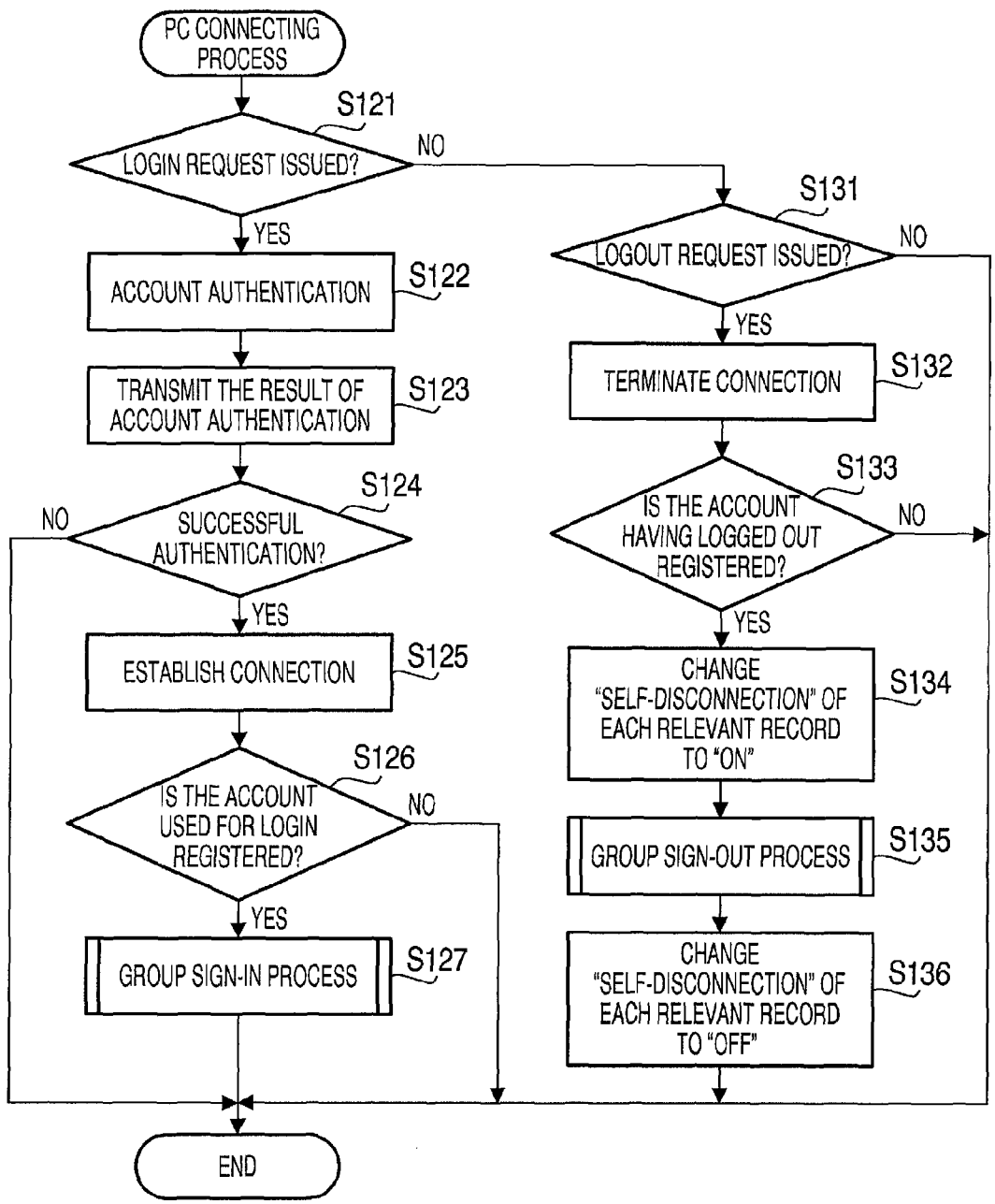

FIG. 6 is a flowchart showing an operational procedure of a PC connecting process to be executed by the cloud server to control a status (login/Logout) of a connection with a PC in the first embodiment according to one or more aspects of the present invention.

Figure 7:
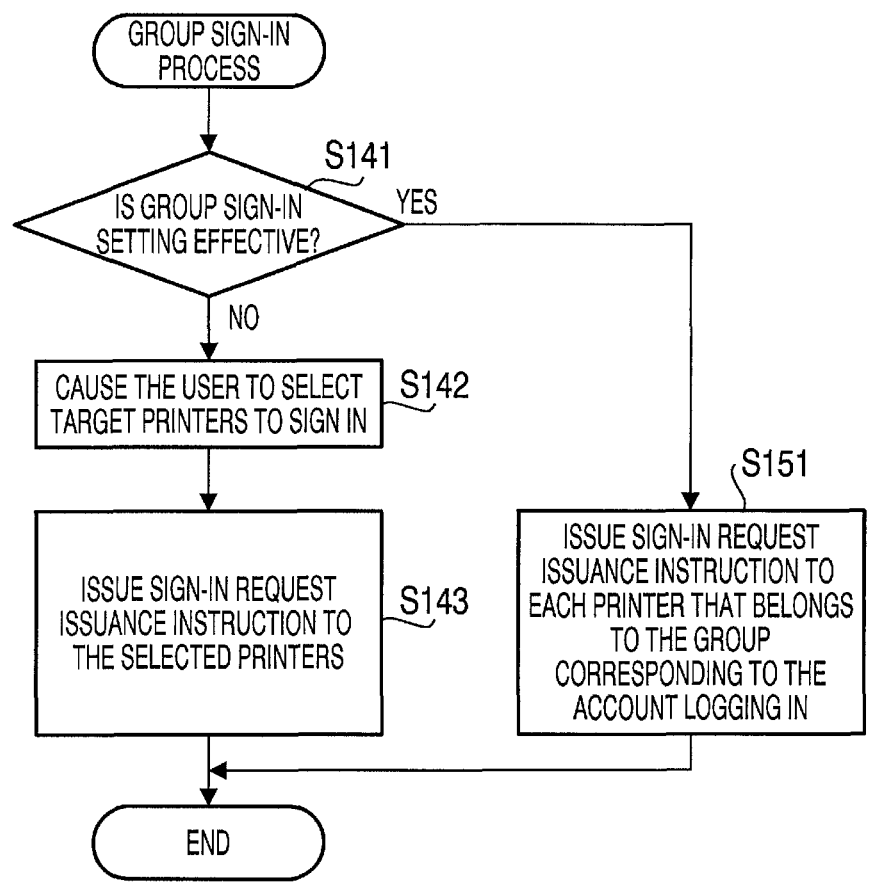

FIG. 7 is a flowchart showing an operational procedure of a group sign-in process to be executed in the PC connecting process by the cloud server in the first embodiment according to one or more aspects of the present invention.

Figure 8:
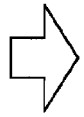

FIG. 8 exemplifies changes of the group DB made in the group sign-in process in the first embodiment according to one or more aspects of the present invention.

FIG. 9 exemplifies changes of the group DB made before a group sign-out process in the first embodiment according to one or more aspects of the present invention.

Figure 10:
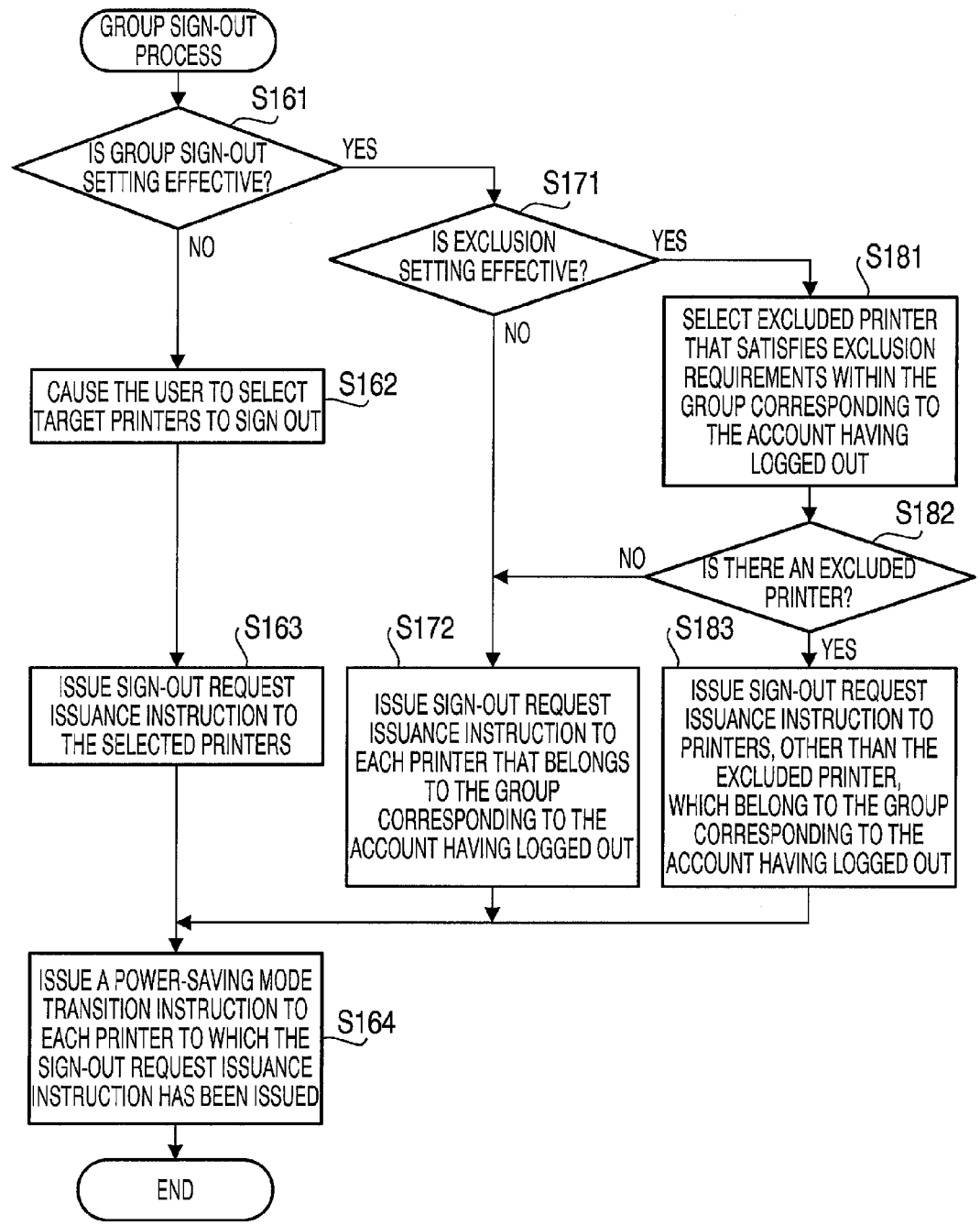

FIG. 10 is a flowchart showing an operational procedure of the group sign-out process to be executed in the PC connecting process by the cloud server in the first embodiment according to one or more aspects of the present invention.

Figure 11:
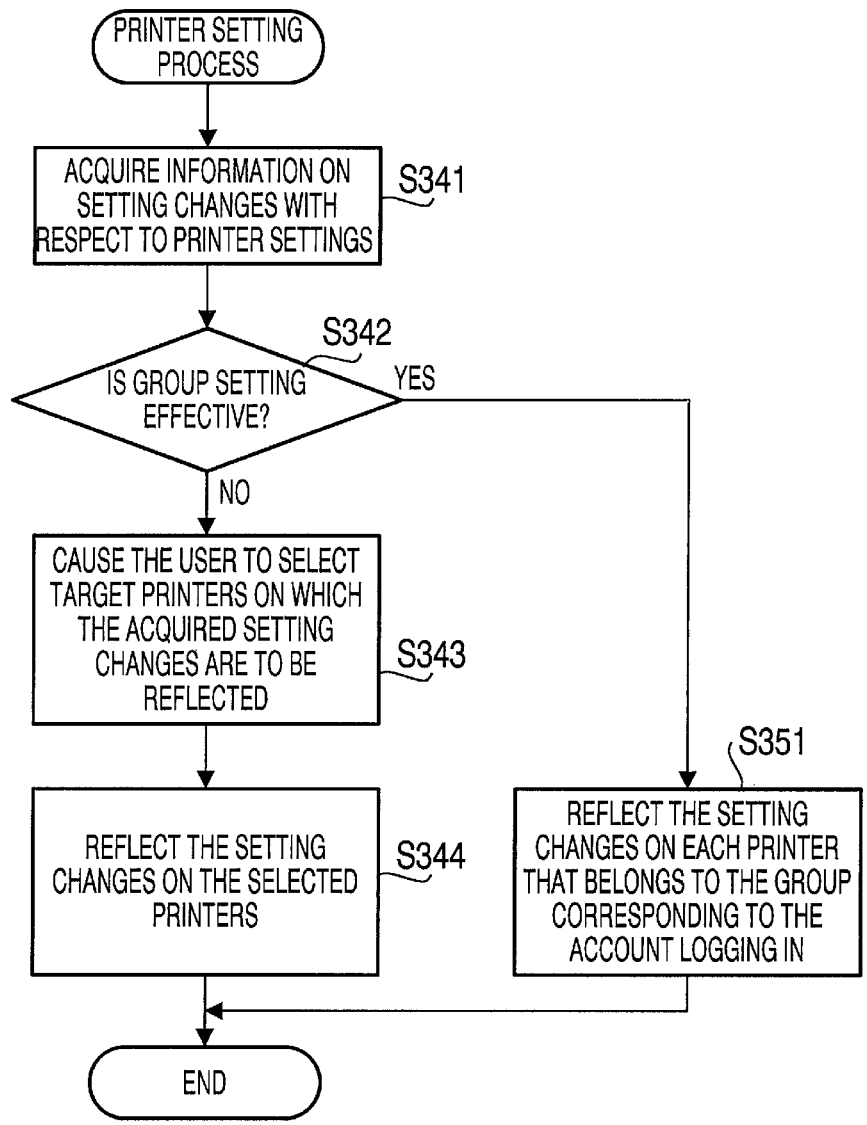

FIG. 11 is a flowchart showing an operational procedure of a printer setting process to be executed by the cloud server to change settings for printers in response to a setting change instruction from the PC in the first embodiment according to one or more aspects of the present invention.

Figure 12:
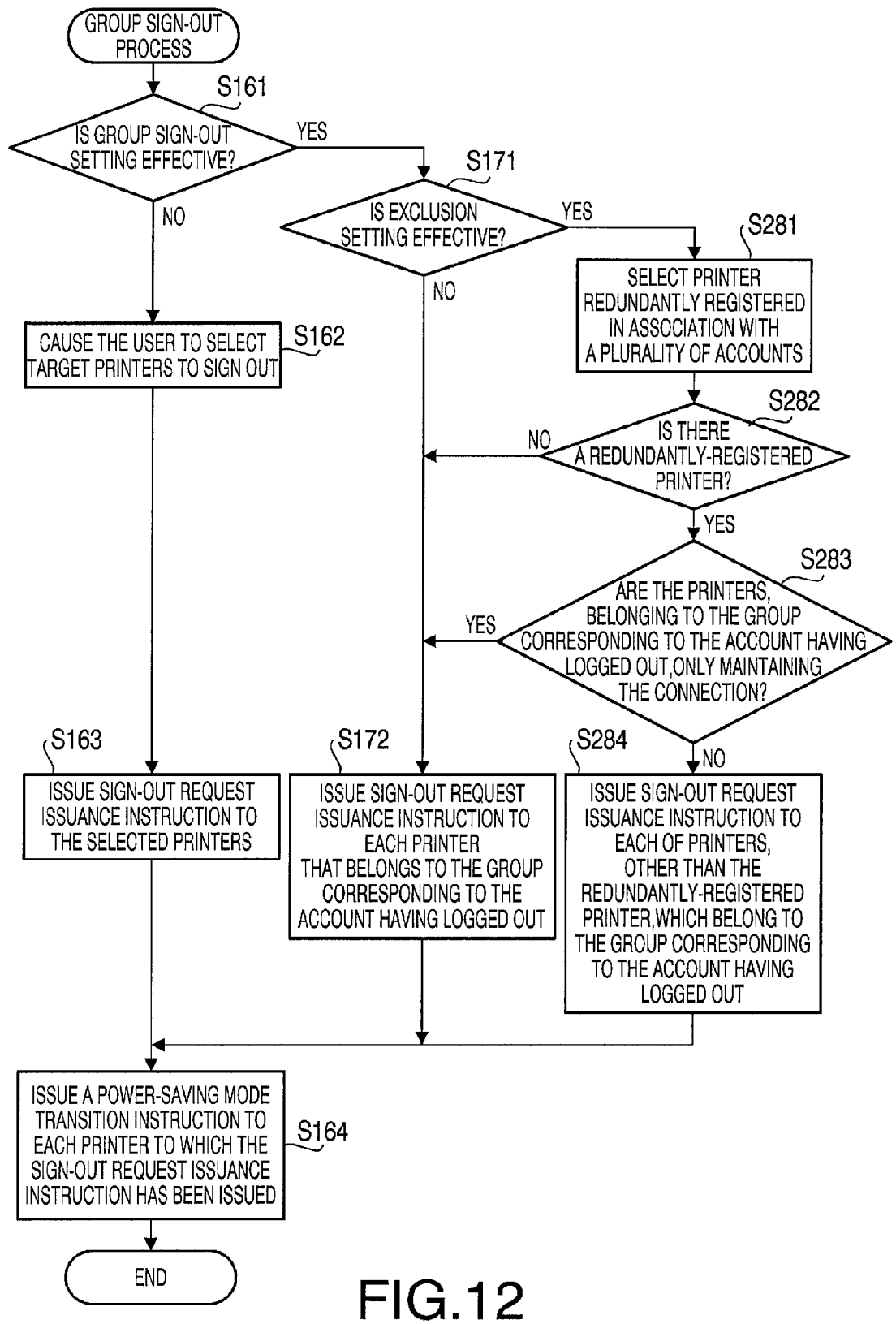

FIG. 12 is a flowchart showing an operational procedure of a group sign-out process to be executed in the PC connecting process by the cloud server in a second embodiment according to one or more aspects of the present invention.

Figure 13:

FIG. 13 exemplifies changes of the group DB made in the second embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described in detail with reference to the accompanying drawings. In the embodiments, aspects of the present invention are applied to an image processing system that includes a cloud server configured to store print data, a printer having a printing function, and a personal computer (PC) configured to create a print job. It is noted that the cloud server, which is a virtual server beyond a cloud in a concept of cloud computing, is configured to be operated on a WEB browser by letting packets pass through the cloud.

[Configuration of Image Processing System]

Figure 1:
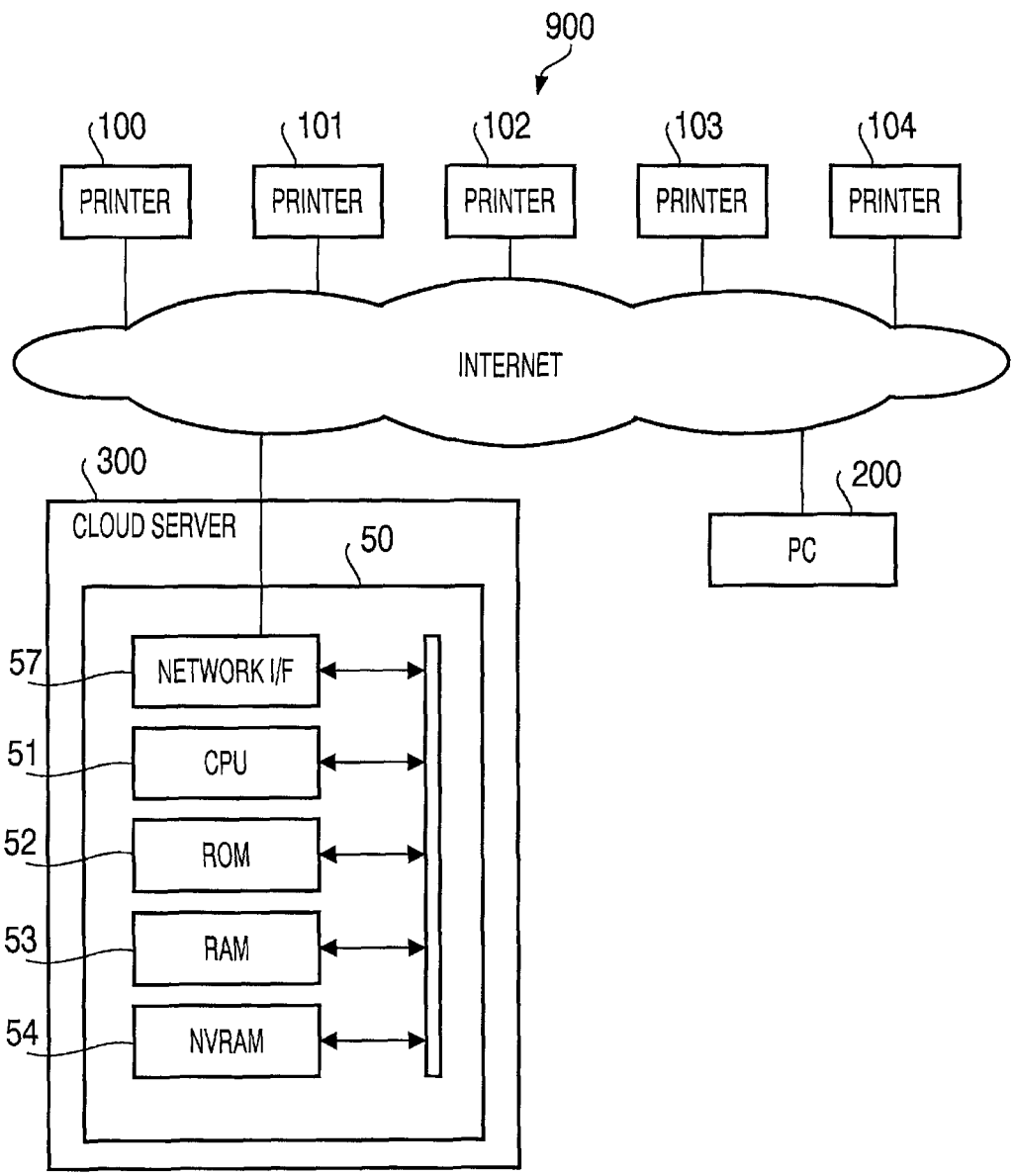
FIG. 1 is a block diagram schematically showing a configuration of an image processing system and an electrical configuration of a cloud server in embodiments according to one or more aspects of the present invention.

As shown in FIG. 1, an image processing system 900 according to aspects of the present invention includes printers 100, 101, 102, 103, and 104, a PC 200, and a cloud server 300. The cloud server 300 is configured to store a print job output from the PC 200 and transmit the stored print job to the printers 100 to 104.

In the image processing system 900, the PC 200 is required to establish a communication connection with the cloud server 300 in order to transmit a print job to the cloud server 300. Further, each of the printers 100 to 104 is required to establish a communication connection with the cloud server 301) in order to acquire print data from the cloud server 300, it is noted that a state where the communication connection is established contains not only a physically connected state but also a state where the cloud server 300 permits communication with the PC 200 or any of the printers 100 to 104.

In the disclosure, an operation for the PC 200 to establish a communication connection with the cloud server 300 will be referred to as "login." Further, an operation for the PC 200 to terminate the communication connection will be referred to as "logout." In addition, an operation for a printer 100, 101, 102, 103, or 104 to establish a communication connection with the cloud server 300 will be referred to as "sign-in," Furthermore, an operation for the printer to terminate the communication connection will be referred to as "sign-out."

It is noted that there may be one or more image processing devices (such as different printers, image scanners, and facsimile machines) connected with the cloud server 300 other than the printers 100 to 104. However, FIG. 1 shows only the printers 100 to 104 as examples of the image processing devices connected with the cloud server 300 for the sake of descriptive simplicity. Further, there may be one or more information processing devices (such as different PCs and smart phones) connected with the cloud server 300 other than the PC 200. However, FIG. 1 shows only the PC 200 as an example of the information processing devices connected with the cloud server 300 for the sake of descriptive simplicity.

[Configuration of Cloud Server]

In the disclosure, as shown in FIG. 1, the cloud server 300 includes a controller 50 that includes a CPU 51, a ROM 52, a RAM 53, a non-volatile RAM (NVRAM) 54, and a network interface 57.

030The ROM 52 stores programs for managing jobs and various kinds of information (such as settings and initial values). The RAM 53 and the NVRAM 54 are utilized as work areas for loading various programs thereinto or storage areas for temporarily storing data.

The CPU 51 is configured to perform a management operation of managing a job while storing processing results into the RAM 53 or the NVRAM 54 in accordance with the programs read out from the ROM 52.

The network interface 57 is an interface for achieving communication with other devices. The cloud server 300 receives, via the network interface 57, various requests transmitted by the printers 100 to 104 or the print job transmitted from the PC 200.

Figure 2:
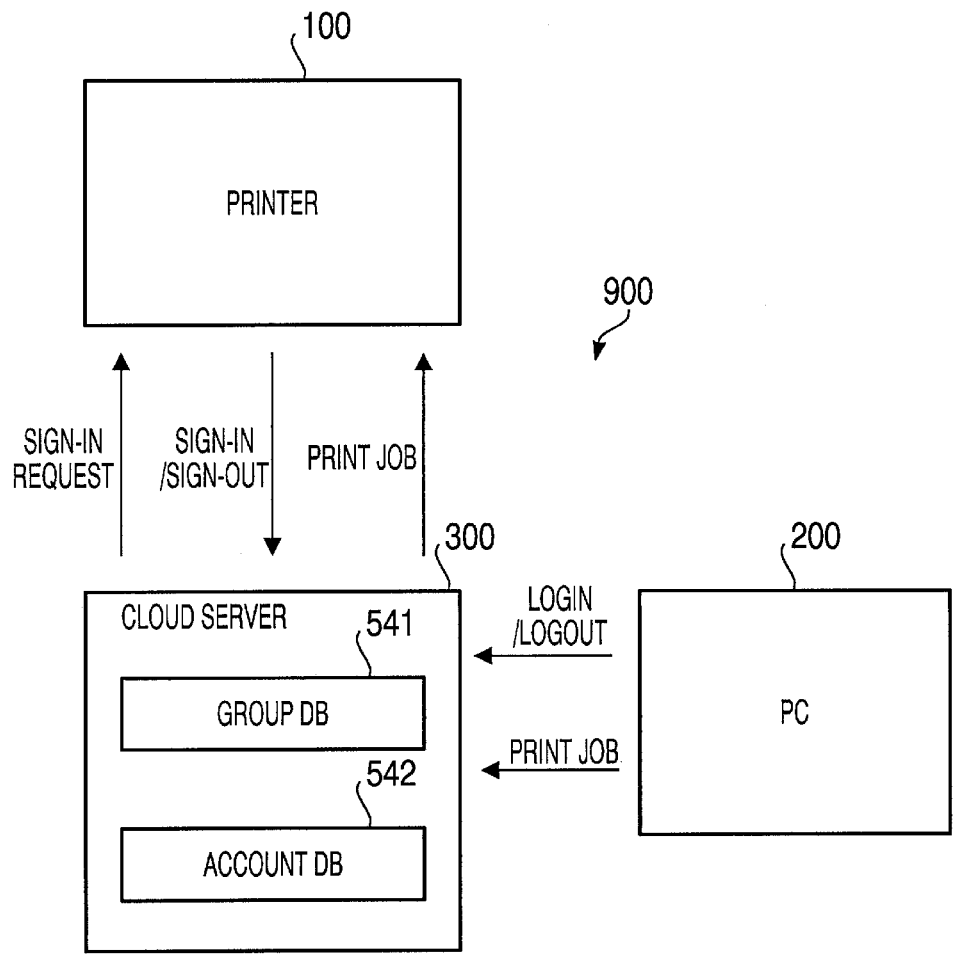
FIG. 2 is a block diagram schematically showing operations of the image processing system in the embodiments according to one or more aspects of the present invention.

As shown in FIG. 2, the cloud server 300 has a database (hereinafter referred to as a "group DB 541") for grouping and managing printers, which utilize the cloud server 300, by account. The group DB 541 is in a storage device (such as the RAM 53 and the NVRAM 54) of the cloud server 300.

Specifically, as shown in FIG. 3, the group DB 541 is configured to store records each of which contains (respective values for) information items such as "group name," "account name," "printer name," "printer address," "establishment status," "establishment time," and "self-disconnection." Registration of a record in the group DB 541 is automatically carried out when a printer signs in on the cloud server 300. An additional record may be registered in the group DB 541 by a user having an administrative authority.

The "account name," which is one of the information items contained in each record stored in the group DB 541, is information for identifying an account used for signing in on the cloud server 300. The "printer name" is information for identifying (a name of) a printer. The "printer address" is information for storing an address of the printer identified by the "printer name," In the disclosure, an IP address is stored for the "printer address." However, any information for identifying an address of a printer, such as a MAC address, may be stored for the "printer address." The "establishment status" provides information as to whether the connection is currently being established (maintained) between the cloud server 300 and the printer identified by the "printer name." Specifically, a value "IN" for the "establishment status" represents a status where the printer identified by the "printer name" has signed in on the cloud server 300 (and the established connection therebetween is currently maintained). Meanwhile, a value "OUT" for the "establishment status" represents a status where the printer identified by the "printer name" has signed out from the cloud server 300 (and the connection therebetween is not currently maintained). The "establishment time" provides information on a time when the last sign-in was performed between the cloud server 300 and the printer identified by the "printer name." The "self-disconnection" is information representing whether a sign-out request is a request issued by the cloud server 300 or by the printer by the user). For instance, when a sign-out instruction is input by a user through an operation panel of a printer, a sign-out request is issued by the printer. When the "self-disconnection" has a value "ON," it represents that a sign-out request is a request issued by the cloud server 300. Meanwhile, when the "self-disconnection" has a value "OFF," it represents that a sign-out request is a request issued by the printer identified by the "printer name." The value "OFF" is stored as an initial setting value for the "self-disconnection." An explanation will be provided later about an exemplary case where the value for the "self-disconnection" is changed to "ON."

The cloud server 300 manages records having the same account name, of the records registered in the group DB 541, as a single group. The "group name" of the group DB 541 is information for identifying a group. When a new record is added, if there is a record registered in the group DB 541 with the same account name as an account name included in the new record, the new record is provided with the same group name as the registered record. Meanwhile, if there is no record registered with the same account name as the new record, the new record is provided with a new group name different from the group name of any other record registered in the group DB 541.

In addition, the cloud server 300 has a database (hereinafter referred to as an "account DB 542") for storing accounts in association with respective passwords. The account DB 542 is referred to in an authentication process for sign-in or login. Specifically, as shown in FIG. 4, the account DB 542 is configured to store records each of which contains an account name and a password corresponding to the account name. The records are registered in the account DB 542 by a user having an administrative authority, in advance of sign-in and login.

[Overview of Operations of Image Processing System]

Subsequently, an overview of operations of the image processing system 900 will be described with reference to FIG. 2. In order to carry out printing with the image processing system 900, it is required to previously establish both a communication connection between the printer 100 and the cloud server 300 and a communication connection between the PC 200 and the cloud server 300.

Firstly, in the sign-in for establishing the communication connection between the printer 100 and the cloud server 300, the user enters an account and a password for the account in the printer 100. Then, when the cloud server 300 certificates the group account, the communication connection between the printer 100 and the cloud server 300 is established.

When establishing the communication connection with the cloud server 300, that is, successfully signing in on the cloud server 300, the printer 100 begins to periodically issue a transmission request to the cloud server 300. The periodically-issued transmission request requests the cloud server 300 to transmit print job to the printer 100 when the cloud server 300 receives the print job from a user belonging to the account used for the sign-in. The printer 100 receives the print job that is transmitted by the cloud server 300 in response to the transmission request, and performs printing based on the print job.

Meanwhile, in the login for establishing the communication connection between the PC 200 and the cloud server 300, the user enters an account and a password for the account in the PC 200. The account is the same account as used for the sign-in. Then, when the cloud server 300 certificates the account, the communication connection between the PC 200 and the cloud server 300 is established.

When the communication connection is established between the PC 200 and the cloud server 300, that is, the login is successfully achieved, the print job is allowed to be transmitted from the PC 200 to the cloud server 300. The transmitted print job is once stored in a print buffer of the cloud server 300. Then, when the printer 100 issues the transmission request to the cloud server 300, the print job is transmitted to the printer 100, such that the printer 100 performs printing based on the print job.

Control of Cloud Server

First Embodiment

Subsequently, an explanation will be provided about operational procedures of the cloud server 300 to achieve the aforementioned operations of the image processing system 900.

[Sign-in and Sign-Out]

Firstly an explanation will be provided about an operational procedure of a printer connecting process for controlling the status (sign-in/sign-out) of the connection with the printer 100, with reference to FIG. 5. The printer connecting process is periodically (e.g., every one second) performed by the controller 50, it is noted that the controller 50 controls the status of the connection with image processing devices other than the printer 100 in the same procedure.

In the printer connecting process, firstly, the controller 50 determines whether there is a sign-in request issued by the printer 100 (S101). When determining that there is a sign-in request issued by the printer 100 (S101: Yes), the controller 50 acquires authentication information added to the sign-in request, and performs account authentication based on the authentication information (S102). Specifically, in S102, the controller 50 acquires the authentication information which contains the account and the password entered by the user, and determines whether a combination of the account and the password contained in the acquired authentication information is coincident with the account information managed in the account DB 542. When determining that the combination of the account and the password is coincident with the account information managed in the account DB 542, the controller 50 succeeds in the account authentication. Meanwhile, when determining that the combination of the account and the password is not coincident with the account information managed in the account DB 542, the controller 50 fails in the account authentication. Thereafter, the controller 50 transmits the result of the account authentication to the printer 100 which has issued the sign-in request (S103).

Next, the controller 50 determines whether the controller 50 has succeeded in the account authentication attempted in S102 (S104). When determining that the controller 50 has failed in the account authentication (S104: No), the controller 50 terminates the printer connecting process without establishing the connection with the printer 100.

When determining that the controller 50 has succeeded in the account authentication (S104: Yes), the controller 50 establishes the connection with the printer 100 (S105), such that the cloud server 300 begins to accept the transmission request issued by the printer 100.

After S105, the cloud server 300 updates the group DB 541. In a process to update the group DB 541, firstly, the controller 50 determines whether a combination of the printer 100 which has succeeded in the sign-in and the account entered by the user for the sign-in is registered in the group DB 541 (S106). Namely, in the case where the same printer has ever established the connection with the cloud server 300 using the same account, a record having the combination of the same printer and the same account may be retained in the group DB 541. At the time of issuance of the sign-in request by the printer 100, the previous connection between the cloud server 300 and the printer 100 is terminated. Therefore, in the group DB 541, the value "OUT" is stored for the establishment status of the record for the printer 100. Thus, when determining that a combination of the printer 100 which has succeeded in the sign-in and the account entered by the user for the sign-in is registered in the group DB 541 (S106: Yes), the controller 50 changes the value for the "establishment status" of the record having the combination to "IN" (S107). Further, the controller 50 updates the establishment time of the record. After S107, the controller 50 terminates the printer connecting process.

Meanwhile, when determining that a combination of the printer 100 which has succeeded in the sign-in and the account entered by the user for the sign-in is not registered in the group DB 541 (S106: No), the controller 50 determines whether there is a record previously registered in the group DB 541 that has the same account as the account entered by the user for the sign-in (S108). When determining that there is a record previously registered in the group DB 541 that has the same account as the account entered by the user for the sign-in (S108: Yes), the controller 50 creates a record having the same group name as the group name of the previously-registered record having the same account as the account entered by the user for the sign-in, and stores into the created record the combination of the printer 100 which has succeeded in the sign-in and the account entered by the user for the sign-in (S109). Namely the controller 50 registers the printer 100 as a member of the existing (previously-registered) group.

When determining that there is not a record previously registered in the group DB 541 that has the same account as the account entered by the user for the sign-in (S108: No), the controller 50 creates a record having a new group name different from any other existing group name, and stores (registers) into the created record the combination of the printer 100 which has succeeded in the sign-in and the account entered by the user for the sign-in (S110). Namely, the controller 50 registers the printer 100 as a member of the newly registered group. After execution of S109 or S110, the controller 50 terminates the printer connecting process.

Meanwhile, referring back to S101, when determining that there is not a sign-in request issued by the printer 100 (S101: No), the controller 50 determines whether there is a sign-out request issued by the printer 100 (S111). When determining that there is not a sign-out request issued by the printer 100 (S111: No), the controller 50 terminates the printer connecting process.

When determining that there is a sign-out request issued by the printer 100 (S111: Yes), the controller 50 terminates the connection with the printer 100 (S112). It is noted that, in S112, the cloud server 300 does not cut off the physical connection with the printer 100 but halts receipt of the transmission request from the printer 100.

After S112, the controller 50 determines whether the sign-out request is a request issued in response to a sign-out request issuance instruction issued from the cloud server 300 to the printer 100 (S113). In S113, the controller 50 determines that the sign-out request is a request issued in response to a sign-out request issuance instruction issued from the cloud server 300 to the printer 100, when the record having the combination of the printer 100 and the account used for the sign-ho stores the value "ON" for the "self-disconnection." An explanation will be provided later about an exemplary case where the value for the "self-disconnection" is changed to "ON."

When determining that the sign-out request is a request issued in response to a sign-out request issuance instruction issued from the cloud server 300 to the printer 100 (S113: Yes), the controller 50 changes the value for the "establishment status" of the record having the combination of the printer 100 and the account used for the sign-in, to "OUT" (S114). Thus, the controller 50 leaves the record stored in the group DB 541.

Meanwhile, when determining that the sign-out request is not a request issued in response to a sign-out request issuance instruction issued from the cloud server 300 to the printer 100 (S113: No), the controller 50 deletes, from the group DB 541, the record having the combination of the printer 100 and the account used for the sign-in (S115). After execution of S114 or S115, the controller 50 terminates the printer connecting process.

[Login and Logout]

Subsequently, an explanation will be provided about an operational procedure of a PC connecting process for controlling the status (login/logout) of the connection with the PC 200, with reference to FIG. 6. The printer connecting process is periodically (e.g., every one second) performed by the controller 50. It is noted that the controller 50 controls the status of the connection with information processing devices other than the PC 200 in the same procedure.

In the printer connecting process, firstly, the controller 50 determines whether there is a login request issued by the PC 200 (S121). When determining that there is a login request issued by the PC 200 (S121: Yes), the controller 50 acquires authentication information added to the login request, and performs account authentication based on the authentication information (S122). In S122, the controller 50 performs operations equivalent to those in S102. Thereafter, the controller 50 transmits the result of the account authentication to the PC 200 which has issued the login request (S123).

Next, the controller 50 determines whether the controller 50 has succeeded in the account authentication attempted in S122 (S124). When determining that the controller 50 has failed in the account authentication (S124: No), the controller 50 terminates the PC connecting process without establishing the connection with the PC 200.

When determining that the controller 50 has succeeded in the account authentication (S124: Yes), the controller 50 establishes the connection with the PC 200 (S125), such that the cloud server 300 authorizes acceptance of a job transmitted by the PC 200.

After S125, the controller 50 determines whether the account used when the PC 200 has logged in to the cloud server 300 is registered in the group DB 541 (S126). In S126, when there is a record storing the same account as the account used when the PC 200 has logged in to the cloud server 300, the controller 50 determines that the account used when the PC 200 has logged in to the cloud server 300 is registered in the group DB 541. When determining that the account used when the PC 200 has logged in to the cloud server 300 is not registered in the group DB 541 (S126: No), the controller 50 terminates the PC connecting process.

Meanwhile, When determining that the account used when the PC 200 has logged in to the cloud server 300 is registered in the group DB 541 (S126: Yes), the controller 50 performs a group sign-in process to establish connections with all printers that belong to a group corresponding to the account (S127).

FIG. 7 is a flowchart showing a detailed procedure of the group sign-in process to be executed in S127. In the group sign-in process, as shown in FIG. 7, firstly, the controller 50 determines whether a group sign-in setting is effective (S141). It is noted that the cloud sever 300 is configured to accept user settings that contain the group sign-in setting as to whether to allow each printer belonging to one group to sign in on the cloud server 300 and to store the user settings on the NVRAM 54.

When determining that the group sign-in setting is effective (S141: Yes), the controller 50 transmits, to each of the printers which belong to the group corresponding to the account used when the PC 200 has logged in to the cloud server 300, a sign-in request issuance instruction to instruct each of the printers to issue a sign-in request (S151). In S151, the controller 50 refers to the account DB 542 and adds, to the sign-in request issuance instruction, the account (used when the PC 200 has logged in to the cloud server 300) and the password corresponding to the account. Each printer, which has received the sign-in request issuance instruction, issues a sign-in request to the cloud server 300. If is noted that the controller 50 may be configured not to transmit the sign-in request issuance instruction to a printer that has already signed in on the cloud server 300. Further, even though the controller 50 transmits the sign-in request issuance instruction to a printer that has already signed in on the cloud server 300, the printer may be configured to disregard the sign-in request issuance instruction.

The cloud server 300, which has received the sign-in request from a printer, establishes a connection with the printer in accordance with the aforementioned printer connecting process see FIG. 5). Thereby, among the printers which belong to the group corresponding to the account used when the PC 200 has logged in to the cloud server 300, a printer that has been disconnected from the cloud server 300 at the time of the login is allowed to automatically sign in on the cloud server 300.

For instance, as shown in FIG. 8, when the PC 200 has logged in the cloud server 300 with the account A, the cloud server 300 automatically establishes the connection with the printers 101 and 102 that have been disconnected from the cloud server 300 at the time when the PC 200 has logged in, among the printers 100, 101, and 102 that belong to the group A corresponding to the account A. Consequently, the user who uses the account A is allowed to utilize the printers 100, 101, and 102 without having to perform troublesome operations of inputting a sign-in instruction to the printers 101 and 102.

Meanwhile, when determining that the group sign-in setting is not effective (S141: No), the controller 50 causes the user to select target printers to sign in on the cloud server 300 (S142). Specifically, the controller 50 extracts printers that are currently disconnected from the cloud server 300, from the printers that belong to the group corresponding to the account used when the PC 200 has logged in to the cloud server 300, and issues an instruction to cause the PC 200 to display a dialog for prompting the user to select printers to sign in on the cloud server 300 and printers not to sign in on the cloud server 300. Results regarding the user selection are transmitted from the PC 200 to the cloud server 300.

The cloud server 300, which has received the results regarding the user selection, issues the sign-in request issuance instruction to the selected printers (S143). Thereby, although the user has an additional burden placed on him/her to select the target printers to sign in on the cloud server 300, the user is allowed, to make a determination for each printer as to whether to establish the connection between the printer and the cloud server 300. Thus, it is possible to avoid establishment of the connection between the cloud server 300 and a printer that the user does not wish to utilize and to lessen a processing load regarding establishment of the connection between the cloud server 300 and the printers.

After execution of S143 or S151, the controller 50 terminates the group sign-in process. Further, going back to the PC connecting process shown in FIG. 6, the controller 50 terminates the PC connecting process after execution of the group sign-in process in S127.

Meanwhile, referring back to S121, when determining that there is not a login request issued, by the PC 200 (S121: No), the controller 50 determines whether there is a logout request issued by the PC 200 (S131). When determining that there is not a logout request issued by the PC 200 (S131: No), the controller 50 terminates the PC connecting process.

Meanwhile, when determining that there is a logout request issued by the PC 200 (S131: Yes), the controller 50 terminate the connection with the PC 200 (S132). It is noted that, in S132, the cloud server 300 does not cut off the physical connection with the PC 200 but prohibits acceptance of the job from the PC 200.

Further, after S132, the controller 50 determines whether the account with which the PC 200 has logged out from the cloud server 300 is registered in the group DB 541 (S133). Namely, in S133, the controller 50 determines whether there is a printer that belongs to the group corresponding to the account with which the PC 200 has logged out from the cloud server 300. When determining that the account with which the PC 200 has logged out from the cloud server 300 is not registered in the group DB 541 (S133: No), the controller 50 terminates the PC connecting process.

Meanwhile, when determining that the account with which the PC 200 has logged out from the cloud server 300 is registered in the group DB 541 (S133: Yes), the controller 50 changes, to "ON," the value for the "self-disconnection" of the record for each printer that belongs to the group corresponding to the account (S134). For instance, as shown in FIG. 9, in the case where the account with which the PC 200 has logged out from the cloud server 300 is the account A, the controller 50 changes, to "ON," the value of the "self-disconnection" for each of the printers 100, 101, and 102 that belong to the group A corresponding to the account A. Thereafter, the controller 50 performs a group sign-out process to terminate the connection with each printer that belongs to the group corresponding to the account (S135).

FIG. 10 is a flowchart showing a detailed procedure of the group sign-out process to be executed in S135. In the group sign-out process, firstly, the controller 50 determines whether a group sign-out setting is effective (S161), it is noted that the cloud sever 300 is configured to accept user settings that contain the group sign-out setting as to whether to allow each printer belonging to one group to sign out from the cloud server 300 and to store the user settings on the NVRAM 54.

When determining that the group sign-out setting is effective (S161: Yes), the controller 50 determines whether an exclusion setting, which is for excluding printers that satisfy exclusion requirements from target printers to sign out from the cloud server 300, is effective (S171). The cloud sever 300 is configured to accept user settings that contain the exclusion setting and to store the user settings on the NVRAM 54.

The exclusion requirements may include a requirement that an elapsed time since a printer has signed in on the cloud server 300 is equal to or less than a predetermined time (e.g., 10 minutes). The predetermined time may be set by the user or before shipment. A printer, immediately after having signed in on the cloud server 300, is likely to be utilized shortly. Hence, when the connection between the printer and the cloud server 300 is terminated in such a situation, it might cause inconvenience to the user. Therefore, the printer is desired to be excluded from the target printers to sign out from the cloud server 300. The elapsed time since the sign-in is determined based on the value for the "establishment time" stored in each record of the group DB 541.

The exclusion requirements may include a requirement that a printer, which belongs to a plurality of groups, is maintaining the established connection with the cloud server 300 with respect to two or more groups. A printer, which is maintaining the connection with the cloud server with respect to two or more accounts, is utilized with an account different from the account with which the PC 200 has logged out from the cloud server 300. Hence, when the connection between the printer and the cloud server 300 is terminated, it might cause inconvenience to users of the different account. Therefore, the printer is desired to be excluded from the target printers to sign out from the cloud server 300.

The exclusion requirements may include a requirement that a printer is arbitrarily selected by the user as a printer to be excluded. For instance, when the user is allowed to arbitrarily select a printer to be excluded, it is possible to secure an instantly available printer even though the connections between the cloud server 300 and a plurality of printers are terminated at one time.

When determining that the exclusion setting is effective (S171: Yes), the controller 50 selects a printer (hereinafter referred to as an "excluded primer") that satisfies the exclusion requirements within the group corresponding to the account with which the PC 200 has logged out from the cloud server 300 (S181). Then, the controller 50 determines whether there is an excluded printer (S182).

When determining that there is an excluded printer (S182: Yes), the controller 50 issues a sign-out request issuance instruction to instruct printers, other than the excluded printer, which belong to the group corresponding to the account with which the PC 200 has logged out from the cloud server 300, to issue a sign-out request (S183). Each printer that has received the sign-out request issuance instruction issues the sign-out request to the cloud server 300. It is noted that the controller 50 may not issue the sign-out request issuance instruction to printers that have already signed out. Further, even though the controller 50 issues the sign-out request issuance instruction to printers that have already signed out, the printers that have already signed out may disregard the sign-out request issuance instruction.

The cloud server 300, which has received the sign-out request from a printer, terminates the connection with the printer in accordance with the printer connecting process see FIG. 5). Thereby, a printer that has maintained the established connection with the cloud server 300 at the time when the PC 200 has logged out from the cloud server 300, among the printers that belong to the group corresponding to the account with which the PC 200 has logged out, automatically signs out from the cloud server 300. Consequently, the user who uses the account with which the PC 200 has logged out is allowed to finish utilizing each of the target printers to sign out, without having to perform troublesome operations of inputting a sign-out instruction to each of the target printers to sign out.

It is noted that, when a printer signs out after the cloud server 300 has issued the sign-out request issuance instruction as executed in S183, the record for the printer is not deleted in the printer connecting process since the value for the "self-disconnection" of the record for the printer is changed to "ON" in S134. Therefore, when the PC 200 again logs in to the cloud server 300 after the printer has signed out, the printer is identified as a target printer to automatically sign in in the group sign-in process of S127. Meanwhile, when a printer signs out in response to a user instruction, it is presumed that the user does not have an intention to utilize the printer to sign out. Hence, in such a case, the printer is excluded from the group corresponding to the account with which the PC 200 has again logged in, so as to be excluded from target printers to automatically sign in in the group sign-in process of S127. The same applies to below-mentioned steps S172 and S163.

When there is not an excluded printer (S182: No), or the exclusion setting is not effective (S171: No), all printers that belong to the group corresponding to the account with which the PC 200 has logged out from the cloud server 300 are identified as target printers to automatically sign out. Thus, the controller 50 issues the sign-out request issuance instruction to each printer that belongs to the group corresponding to the account with which the PC 200 has logged out (S172).

Further, when determining that the group sign-out setting is not effective (S161: No), the controller 50 causes the user to select target printers to sign out from the cloud server 300 (S162). Specifically, the controller 50 extracts printers that are currently maintaining the established connection with the cloud server 300, from the printers that belong to the group corresponding to the account with which the PC 200 has logged out from the cloud server 300, and issues an instruction to cause the PC 200 to display a dialog for prompting the user to select printers to sign out and printers not to sign out. Results regarding the user selection are transmitted from the PC 200 to the cloud server 300.

The cloud server 300, which has received the results regarding the user selection, issues the sign-out request issuance instruction to the selected printers (S163). Thereby, although the user has an additional burden placed on him/her to select the target printers to sign out from the cloud server 300, the user is allowed to make a determination for each printer as to whether to terminate the connection between the printer and the cloud server 300. Thus, it is possible to secure an available printer and meet a pressing print job.

After execution of S163, S172, or S183, the controller 50 issues a power-saving mode transition instruction for transition to a power-saving mode, to the printers to which the controller 50 has issued the sign-out request issuance instruction (S164). Thereby, it is possible to reduce an amount of energy wasted in the printers that have signed out from the cloud server 300. After S164, the controller 50 terminates the group sign-out process. Further, referring back to FIG. 6 showing the PC connecting process, after execution of the group sign-out process in S135, the controller 50 waits for each of the printers to which the controller 50 has issued the sign-out request issuance instruction to complete signing out from the cloud server 300, for a predetermined time period, and then restore, to the initial value "OFF" the value for the "self-disconnection" of each record of which the value for the "self-disconnection" has been changed to "ON" in S134 (S136). Thereafter, the controller 50 terminates the PC connecting process.

It is noted that, in the group sign-in process to be executed in S127 (see FIG. 7), the controller 50 determines in S141 whether the group sign-in setting is effective, and when determining that the group sign-in setting is not effective (S141: No), the controller 50 causes (prompts) the user to select target printers to sign in on the cloud server 300 (S142). However, without making the determination of S141, the controller 50 may go to S151 to transmit the sign-in request issuance instruction to each of the printers which belong to the group corresponding to the account used when the PC 200 has logged in to the cloud server 300. The same may apply to S161 in the group sign-out process of S135 (see FIG. 10).

Further, in the group sign-out process to be executed in S135 (see FIG. 10), the controller 50 determines in S171 whether the exclusion setting is effective, and when determining that the exclusion setting is effective (S171: Yes), the controller 50 selects a printer to be excluded from the target printers to sign out in the group sign-out process. However, without executing S181 and the subsequent steps, the controller 50 may go to S172 to issue the sign-out request issuance instruction to each printer that belongs to the group corresponding to the account with which the PC 200 has logged out (S172).

[Printer Settings]

Subsequently, an explanation will be provided about an operational procedure of a printer setting process, in which the cloud server 300 changes settings for printers in response to a setting change instruction from the PC 200, with reference to FIG. 11. The printer setting process is executed by the controller 50 in response to receipt of a setting change instruction for changing printer settings from the PC 200.

In the printer setting process, firstly, the controller 50 acquires, from the PC 200, information on setting changes with respect to printer settings (S341). The printer settings may contain settings regarding transition to the power-saving mode, a time interval between the transmission requests that a printer periodically issues after sign-in, and a time-out time. Further, the printer settings may contain settings relating to an operation panel (such as a language setting, a contrasting density for a liquid-crystal panel, and a speed for scrolling a text) and settings relating to an interface (such as a selection of an interface, and a size of a receive buffer).

Next, the controller 50 determines whether a group setting is effective (S342). The cloud server 300 is configured to accept user settings that contain the group setting as to whether to configure the printer settings for each printer belonging to one group and to store the user settings on the NVRAM 54.

When determining that the group setting is effective (S342: Yes), the controller 50 reflects the setting changes with respect to the printer settings acquired in S341, on each printer that belongs to the group corresponding to the account with which the PC 200 is currently logging in to the cloud server 300 (S351). Namely, the controller 50 configures (changes) the printer settings for each printer belonging to one group. Thereby, the user is allowed to collectively configure (change) the printer settings for each printer belonging to one group.

Meanwhile, when determining that the group setting is not effective (S342: No), the controller 50 causes the user to select target printers on which the setting changes acquired in S341 are to be reflected (S343). Specifically, the controller 50 extracts printers that are currently maintaining the established connection with the cloud server 300, from the printers that belong to the group corresponding to the account used when the PC 200 has logged in to the cloud server 300, and issues an instruction to cause the PC 200 to display a dialog for prompting the user to make a selection (determination) individually for each of the extracted printers as to whether to reflect the setting changes on the printer. Results regarding the user selection are transmitted from the PC 200 to the cloud server 300.

The cloud server 300, which has received the results regarding the user selection, reflects the setting changes on the selected target printers (S344). Thereby, although the user has an additional burden placed on him/her to select the target printers on which the setting changes are to be reflected, the user is allowed to make a determination individually for each printer as to whether to reflect the setting changes on the printer.

Second Embodiment

Subsequently, an explanation will be provided about an exemplary application of the aforementioned operation procedures of the cloud server 300. FIG. 12 is a flowchart showing a procedure of a group sign-out process of a second embodiment, as an exemplary application of the group sign-out process shown in FIG. 10.

It is noted that, in FIG. 12, the same operations (steps) as exemplified in the first embodiment will be provided with the same reference characters as those of the first embodiment, and explanations about the operations will be omitted. Specifically, the step S161 and the operations to be subsequently executed after the negative determination in S161 that the group sign-out setting is not effective (S161: No) are applied in common between the first and second embodiments, and therefore, explanations about them will be omitted. Additionally, the step S171 and the operations to be subsequently executed after the negative determination in S171 that the exclusion setting is not effective (S171: No) are applied in common between the first and second embodiments, and therefore, explanations about them will be omitted.

In the second embodiment, when determining that the exclusion setting is effective (S171: Yes), the controller 50 refers to the group DB 541 and selects a printer redundantly registered in association with a plurality of accounts (S281). For instance, as shown in a table for "Before Logout" of FIG. 13, the printer 102 is redundantly registered in association with the account A and the account B. In S281, such a printer is selected as a redundantly-registered printer. It is noted that the selection in S281 is made regardless of whether a printer establishes the connection with the cloud server 300.

Next, the controller 50 determines whether there is a redundantly-registered printer selected in S281 (S282). When determining that there is not a redundantly-registered printer selected in S281 (S282: No), the controller 50 goes to S172, where the controller 50 issues the sign-out request issuance instruction to each printer that belongs to the group corresponding to the account with which the PC 00 has logged out.

Meanwhile, when determining that there is a redundantly-registered printer selected in S281 (S282: Yes), the controller 50 determines whether there is a different account with which one or more printers are maintaining the established connection with the cloud server 300, other than the account with which the PC 200 has logged out, that is, whether the printers, belonging to the group corresponding to the account with which the PC 200 has logged out, are only maintaining the established connection with the cloud server 300 (S283). When the printers, belonging to the group corresponding to the account with which the PC 200 has logged out, are only maintaining the established connection with the cloud server 300 (S283: Yes), even though the connection between the redundantly-registered printer and the cloud server 300 is terminated, it is not likely to cause inconvenience to users of accounts other than the account with which the PC 200 has logged out. Hence, the controller 50 goes to S172 to issue the sign-out request issuance instruction to each of the printers, including the redundantly-registered printer, which belong to the group corresponding to the account with which the PC 200 has logged out.

Meanwhile, when there is a different account with which one or more printers are maintaining the established connection with the cloud server 300, other than the account with which the PC 200 has logged out, (S283: Yes), if the connection between the redundantly-registered printer and the cloud server 300 is terminated, it is likely to cause inconvenience to a user of the different account other than the account with which the PC 200 has logged out. Hence, the controller 50 issues the sign-out request issuance instruction to each of printers, other than the redundantly-registered printer, which belong to the group corresponding to the account with which the PC 200 has logged out (S284). Namely, as shown in a table for "After Logout" of FIG. 13, the controller 50 does not terminate the connection between the redundantly-registered printer (in FIG. 13, the printer 102) and the cloud server 300. Thereby, it is possible to avoid inconvenience that might be caused to the user of the different account other than the account with which the PC 200 has logged out.

It is noted that, in the second embodiment, when selecting the redundantly-registered printer in S281, the controller 50 does not determine whether the redundantly-registered printer is maintaining the established connection with the cloud server 300. However, the controller 50 may select the redundantly-registered printer in S281 based on an additional requirement that the redundantly-registered printer is maintaining the established connection with the cloud server 300. In this case, when there is a redundantly-registered printer selected in S281, it represents that the selected redundantly-registered printer is maintaining the established connection with the cloud server 300 using a plurality of accounts. In other words, when there is only a single account that is maintaining the established connection with the cloud server 300, the controller 50 does not select any printer as a redundantly-registered printer in S281. Therefore, in such a case, S283 is unnecessary.

As described, above, the cloud server 300 of the first and second embodiments is configured to define a group of printers using the same account and collectively change the settings for each printer belonging to one group. Thereby, it is possible to lessen a burden placed on the user who is required to change the settings for each of the available printers.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The printer 100 exemplified in the aforementioned embodiments may be replaced with any other devices having an image processing function such as an image scanner, a facsimile machine, a copy machine, and a multi-function peripheral. In addition, the PC 200 configured to transmit the print job to the printer 100 may be replaced with mobile devices such as smartphones.

In the aforementioned embodiments, to establish the communication connection between the cloud server 300 and the printer 100, the authentication process is performed with the password. However, aspects of the present invention may be applied to a system configured to establish the communication connection between the cloud server 300 and the printer 100 without the authentication process. For example, the cloud server 300 may acquire information for identifying a printer and then issue the connection request to the printer identified by the acquired information. The same manner may apply to establishment of the communication connection between the cloud server 300 and the PC 200.

In the aforementioned embodiments, the account for establishing the communication connection between the cloud server 300 and the printer 100 is the same as the account for establishing the communication connection between the cloud server 300 and the PC 200. However, different accounts may be used to establish the communication connection between the cloud server 300 and the printer 100 and the communication connection between the cloud server 300 and the PC 200, respectively. For instance, the communication connection between the cloud server 300 and the PC 200 may be established with a user account. Further, the communication connection between the cloud server 300 and the printer 100 may be established with a group account into which a plurality of user accounts are grouped. Thereby, it is possible to use the printer 100 in common with the plurality of users.

In the aforementioned embodiments, the cloud server 300 adds a record to or deletes a record front the group DB 541 (namely, forms or updates a group of printers available for each user) when a printer signs in on or signs out from the cloud server 300. However, the forming (updating) of the group of the printers available for each user may be carried out by a user input at any moment.

In the aforementioned embodiments, the cloud server 300 issues the power-saving mode transition instruction for transition to the power-saving mode, to the printers to which the controller 50 has issued the sign-out request issuance instruction. However, a printer, which has received the sign-out request issuance instruction, may voluntarily go to the power-saving mode.

In the aforementioned embodiments, when the printer 100 signs in on the cloud server 300, the printer 100 periodically issues, to the cloud server 300, the transmission request for transmission of a print job. However, the printer 100 may issue the transmission request to the cloud server 300 in response to receipt of an acquisition request from the cloud server 300.

What is claimed is:

1. A server comprising:
   a communication interface;
   a storage unit configured to store a database comprising a plurality of records, each of the plurality of records including:
   a unique combination of a group name identifying a group and image processing device information for identifying an image processing device associated with the group; and
   first user information associated with the group name and the image processing device information; and
   a controller configured to:
   acquire second user information from an information processing device via the communication interface;
   perform user authentication using the acquired second user information;
   in response to the user authentication being successfully performed, establish a connection with the information processing device, via the communication interface; and
   extract from the database, a record from the plurality of records that includes specific first user information coincident with the second user information used for the successful user authentication; and
   in response to the record including the specific first user information coincident with the second user information used for the successful user authentication being successfully extracted, automatically collectively establish connections with the plurality of image processing devices identified by specific image processing device information included in the extracted record by instructing each of the plurality of image processing devices not already connected to the server to issue a sign-in request to the controller,
   the specific image processing device information being associated with the specific first user information coincident with the second user information used for the successful user authentication to establish the connection between the server and the information processing device,
   the controller additionally configured to:
   acquire a setting change instruction for changing an image processing device setting from the authenticated user via the communication interface;
   determine whether a group setting is effective;
   when the group setting is effective, change the setting on each image processing device in the group according to the setting change instruction; and
   when the group setting is not effective, cause the user to select one or more target image processing devices on which the image processing device settings are to be changed according to the setting change instruction.

2. The server according to claim 1, the controller further configured to terminate connections with the plurality of image processing devices.

3. The server according to claim 2,
   the controller additionally configured to terminate the connection with the information processing device and upon terminating the connection with the information processing device, terminate the connections with each of the plurality of image processing devices.

4. The server according to claim 2, wherein upon the controller terminating the connections with the plurality of image processing devices, the controller determines whether the connection with the plurality of image processing devices is terminated in response to a user instruction,
   wherein the controller is further configured to:
   when the controller determines that the connection with the plurality of image processing devices is terminated in response to the user instruction, exclude the plurality of image processing devices from the group; and
   when the controller determines that the connection with the plurality of image processing devices is terminated regardless of the user instruction, leave the plurality of image processing devices included in the group.

5. The server according to claim 2,
   wherein the controller is configured to place, into a power-saving mode, each of the plurality of image processing devices included in the group when terminating the connection with each of the plurality of image processing devices included in the group.

6. The server according to claim 1, the controller additionally configured to select, from the plurality of image processing devices included in the group, an image processing device to be excluded from target devices for which the settings are to be changed by the controller.

7. The server according to claim 6,
   wherein the controller is configured to select an image processing device belonging to a plurality of groups that are associated with different pieces of user information, respectively.

8. The server according to claim 6,
   wherein the controller is configured to select an image processing device that is maintaining a connection with the server established with respect to a plurality of groups that are associated with different pieces of user information, respectively.

9. The server according to claim 6,
   wherein the controller is configured to select an image processing device to be excluded, when an elapsed time since establishment of a connection between the server and the image processing device to be excluded is equal to or less than a predetermined time period.

10. The server according to claim 1,
    wherein the controller is configured to acquire the first user information from the plurality of image processing devices when the controller establishes the connections with the plurality of image processing devices.

11. The server according to claim 1,
    wherein the controller is configured to determine whether there is user information stored in the storage unit that is identical to the first user information; and
    the controller is further configured to create a new group in which at least one image processing device is registered in association with the first user information, when the management controller determines that there is not user information stored in the storage unit that is identical to the first user information.

12. The server according to claim 1,
    wherein the controller is further configured to:
    determine whether there is user information stored, in the storage unit that is identical to the first user information; and
    when the controller determines that there is user information stored in the storage unit that is identical to the first user information, register the at least one image processing device in the group that includes the image processing devices stored in the storage unit in association with the user information identical to the first user information.

13. The server according to claim 1, wherein the controller is configured to establish the connection with each of the plurality of image processing devices by issuing a sign-in request instruction to each of the plurality of image processing devices.

14. The server of claim 1, wherein the instruction from the controller to each of the plurality of image processing devices not already connected to the server includes the first user information.

15. A server comprising:
a connection interface configured to connect with an external device;
a storage unit configured to store a database comprising a plurality of records, each record of the plurality of records including:
a unique combination of a group name identifying a group and image processing device information for identifying an image processing device associated with the group; and
a first user information associated with the group; and
a controller configured to perform control operations comprising:
establishing a connection with an information processing device, via the connection interface;
in response to the controller successfully establishing the connection with the information processing device, acquiring a second user information for identifying a user who requests to establish the connection with the information processing device;
performing user authentication using the acquired second user information; and
after performing a successful user authentication, extracting, from the database in the storage unit, a record that includes a specific first user information coincident with the acquired second user information;
when a record including the specific first user information coincident with the acquired second user information is extracted from the database, automatically collectively establishing a connection with the plurality of image processing devices identified by the specific image processing device information included in the extracted record, via the connection interface, by instructing each of the plurality of image processing devices not already connected to the server to issue a sign-in request to the controller; and
subsequently, collectively terminating the respective connections with the plurality of image processing devices, via the connection interface,
the controller configured to perform additional control operations comprising:
acquiring a setting change instruction for changing an image processing device setting from the authenticated user via the communication interface;
determining whether a group setting is effective;
when the group setting is effective, changing the setting on each image processing device in the group according to the setting change instruction; and
when the group setting is not effective, causing the user to select one or more target image processing devices on which the image processing device settings are to be changed according to the setting change instruction.

16. A method configured to be implemented on a processor of a controller, comprising:
establishing a connection between a server and an information processing device, via a connection interface;
in response to the controller successfully establishing the connection between the server and the information processing device, acquiring a second user information for identifying a user who requests to establish the connection with the information processing device;
performing user authentication using the acquired second user information; and
after performing a successful user authentication, extracting, from a database in a storage unit of the server, a record that includes a specific first user information coincident with the second user information used for successful user authentication, the database including a plurality of records, each record of the plurality of records including (1) a unique combination of a group name identifying a group and image processing device information for identifying an image processing device associated with the group; and (2) first user information associated with the group name and the image processing device information;
when a record including the specific first user information coincident with the acquired second user information is extracted from the database, automatically collectively establishing connections between the server and the plurality of image processing devices identified by the specific image processing device information included in the extracted record, via the connection interface, by instructing each of the plurality of image processing devices not already connected to the server to issue a sign-in request to the controller; and
acquiring a setting change instruction for changing an image processing device setting from the authenticated user via the connection interface;
determining whether a group setting is effective;
when the group setting is effective, changing the setting on each image processing device in the group according to the setting change instruction; and
when the group setting is not effective, causing the user to select one or more target image processing devices on which the image processing device settings are to be changed according to the setting change instruction.

17. A server comprising:
a communication interface;
a database; and
a controller configured to:
generate a plurality of records that are stored in the database by associating users with image processing devices that the users have previously used, each of the plurality of records including: (1) first user information, wherein the first user information identifies a user; and (2) image processing device information that is associated with the first user information, wherein the image processing device information identifies an image processing device;
establish communication with an information processing device via the communication interface;
acquire second user information from the information processing device;

extract from the database at least one of the plurality of records in which the second user information matches the first user information;

automatically establish communication, via the communication device, with the image processing device that is identified by the image processing device information in the at least one of the extracted plurality records by instructing the identified image processing device to issue a sign-in request to the controller if the image processing device is not already connected to the server;

acquire a setting change instruction for changing an image processing device setting from the authenticated user via the communication interface;

determine whether a group setting is effective;

when the group setting is effective, change the setting on each image processing device in the group according to the setting change instruction; and when the group setting is not effective, cause the user to select one or more target image processing devices on which the image processing device settings are to be changed according to the setting change instruction.

18. The server of claim 17, wherein the controller is additionally configured to authenticate the second user information.

19. The server of claim 17, wherein the controller is additionally configured to:

receive first user information and receive image processing device information;

establish communication with the image processing device identified by the received image processing device information;

upon establishing communication with the image processing device identified by the received image processing device information, determine whether there is an existing record within the database containing both the received first user information and the received image processing device information;

upon determining that there is a record containing both the received first user information and the received image processing device information, change a parameter within the record to indicate a current communication status with the image processing device; and upon determining that there is not a record containing both the received first user information and the received image processing device information, create a new record within the database that contains and associates both the received first user information and the received image processing device information.

* * * * *